United States Patent
Sakamoto et al.

(10) Patent No.: US 10,352,293 B2
(45) Date of Patent: Jul. 16, 2019

(54) FLUID SYSTEM (71) Applicant: DAIKIN INDUSTRIES, LTD., Osaka-shi, Osaka (JP)

(72) Inventors: Tomomi Sakamoto, Osaka (JP); Atsushi Suhara, Osaka (JP)

(73) Assignee: Daikin Industries, Ltd., Osaka (JP)

(*) Notice: Subject to any disclaimer, the term of this patent is extended or adjusted under 35 U.S.C. 154(b) by 56 days.

(21) Appl. No.: 15/517,803

(22) PCT Filed: Oct. 23, 2015

(86) PCT No.: PCT/JP2015/005343
§ 371 (c)(1),
(2) Date: Apr. 7, 2017

(87) PCT Pub. No.: WO2016/063543
PCT Pub. Date: Apr. 28, 2016

(65) Prior Publication Data
US 2017/0314527 A1 Nov. 2, 2017

(30) Foreign Application Priority Data
Oct. 23, 2014 (JP) .................. 2014-216548

(51) Int. Cl.
*F03B 15/08* (2006.01)
*F03B 13/08* (2006.01)
(Continued)

(52) U.S. Cl.
CPC .............. *F03B 15/08* (2013.01); *F03B 13/08* (2013.01); *F03B 15/04* (2013.01); *F03B 15/16* (2013.01);
(Continued)

(58) Field of Classification Search
CPC .......... F03B 15/08; F03B 13/08; F03B 15/04; F03B 15/16; H02P 9/04; F05B 2220/20;
(Continued)

(56) References Cited

U.S. PATENT DOCUMENTS

| 4,496,845 A * | 1/1985 | Ensign .................. F03B 15/12 290/43 |
| 2011/0006530 A1* | 1/2011 | Van Blerk ................ E02B 9/00 290/52 |

(Continued)

FOREIGN PATENT DOCUMENTS

| JP | 9-250442 A | 9/1997 |
| JP | 2004-360482 A | 12/2004 |

(Continued)

OTHER PUBLICATIONS

International Search Report, issued in PCT/JP2015/005343 (PCT/ISA/210), dated Jan. 19, 2016.

*Primary Examiner* — Charles Reid, Jr.
(74) *Attorney, Agent, or Firm* — Birch, Stewart, Kolasch & Birch, LLP (57) ABSTRACT

A control device estimates a flow rate and an effective height difference of a fluid machine based on a characteristic detectable with regard to a rotating electrical machine and correlating with the flow rate and the effective height difference of the fluid machine. A total flow rate in a pipe system is estimated based on these values estimated by the control device and a flow resistance characteristic line, and cooperative control of the fluid machine and the flow rate control valve is performed such that the estimated value of the total flow rate becomes close to a target flow rate of the total flow rate in the pipe system.

12 Claims, 7 Drawing Sheets

(51) Int. Cl.
 F03B 15/04 (2006.01)
 F03B 15/16 (2006.01)
 H02P 9/04 (2006.01)
(52) U.S. Cl.
 CPC ............ *H02P 9/04* (2013.01); *F05B 2220/20* (2013.01); *F05B 2270/3015* (2013.01); *Y02E 10/22* (2013.01); *Y02E 10/226* (2013.01)
(58) Field of Classification Search
 CPC . F05B 2270/3015; Y02E 10/22; Y02E 10/226
 USPC ......... 290/52, 43, 54; 417/330, 331; 60/398, 60/698
 See application file for complete search history.

(56) References Cited

U.S. PATENT DOCUMENTS

2012/0326443 A1    12/2012  Vince et al.
2014/0265328 A1*   9/2014   Van Blerk ............. F03B 11/004
                                                               290/43

FOREIGN PATENT DOCUMENTS

JP    2004-364357 A    12/2004
JP    2009-108756 A     5/2009

* cited by examiner

FLUID SYSTEM

TECHNICAL FIELD

The present invention relates to a fluid system.

BACKGROUND ART

In the known art, for example, a bypass conduit (bypass circuit) is connected in parallel to a fluid system, in which a generator is activated through a water turbine. By controlling a flow rate control valve, which is installed in the bypass conduit, a flow rate at a water supply side is controlled to be constant (see, e.g., Patent Document 1). In the example of Patent Document 1, a flow rate detector (flowmeter) is provided at the water supply side. The frequency of the water turbine is controlled based on the flow rate detected with the flowmeter.

CITATION LIST

Patent Documents

PATENT DOCUMENT 1: Japanese Unexamined Patent Publication No. 2004-360482

SUMMARY OF THE INVENTION

Technical Problem

In general, however, flowmeters are expensive and thus tend to increase costs of the fluid system. Furthermore, a relatively long straight pipe is necessary to obtain a predetermined degree of precision in a flowmeter. Thus, apart from construction costs, also installation space tends to increase.

In view of the foregoing problem, the present invention attempts to provide a fluid system which includes a bypass circuit and in which a total flow rate can be controlled without a flowmeter.

Solution to the Problem

To solve the above problem, a first aspect relates to a fluid system including:

a fluid machine (W) installed in a pipe system (1) which has a height difference and through which a fluid flows;

a rotating electrical machine (G) connected to a rotation shaft (9) of the fluid machine (W);

a flow rate control valve (6) installed in a run of a bypass circuit (5) which is connected in parallel to the fluid machine (W); and a control device (20), which estimates a flow rate (Q) and an effective height difference (H) in the fluid machine (W) based on a characteristic which is detectable with regard to the rotating electrical machine (G) and which correlates with the flow rate (Q) and the effective height difference (H) in the fluid machine (W), estimates a total flow rate (QT) in the pipe system (1) based on a flow resistance characteristic line (S) which indicates a relationship between the effective height difference (H) and the total flow rate (QT) in the pipe system (1), and on the flow rate (Q) and the effective height difference (H) estimated, and performs cooperative control of the fluid machine (W) and the flow rate control valve (6) such that an estimated value of a total flow rate (QT) becomes close to a target flow rate (QT*) of the total flow rate (QT) in the pipe system (1).

In this configuration, the total flow rate (QT) estimated is used to put the fluid machine (W) and the flow rate control valve (6) under cooperative control such that the fluid machine (W) and the flow rate control valve (6) become close to the target flow rate (QT*) of the total flow rate (QT).

Further, in a second aspect, which is an embodiment of the first aspect, the control device (20) may obtain the total flow rate (QT) and the effective height difference (H) at a plurality of operating points of the rotating electrical machine (G) to build the flow resistance characteristic line (S).

In this configuration, the control device (20) is capable of building the flow resistance characteristic line (S).

Further, in a third aspect, which is an embodiment of the second aspect, the control device (20) may be capable of renewing the flow resistance characteristic line (S) built.

In this configuration, the control device (20) is capable of renewing the flow resistance characteristic line (S).

Further, in a fourth aspect, which is an embodiment of any one of the first to third aspects, the control device (20) may repeat the cooperative control such that the estimated value converges to the target flow rate (QT*).

In this configuration, the estimated value converges to the target flow rate (QT*).

Further, in a fifth aspect, which is an embodiment of any one of the first to fourth aspects, the control device (20) may perform the cooperative control such that any operating state among an operating state in which the fluid system, the rotating electrical machine (G) of which serves as a generator, achieves a maximum power-generating capacity, an operating state in which the rotating electrical machine (G) achieves maximum efficiency, and an operating state in which the fluid machine (W) achieves a maximum efficiency is obtained.

In this configuration, the fluid machine (W) and the flow rate control valve (6) are under cooperative control such that highly efficient operation modes can be obtained.

Advantages of the Invention

According to the first aspect, in a fluid system, which includes a bypass circuit, the total flow rate can be controlled without using a flowmeter. Consequently, costs can be expected to decrease and space can be expected to be saved, as compared to the case of total flow rate control with a flowmeter.

Further, according to the second aspect, a flow resistance characteristic line can be easily built.

Moreover, according to the third aspect, the flow resistance characteristic line is appropriately renewed, which is why the flow rate can be estimated at a high degree of precision.

Furthermore, according to the fourth aspect, a required total flow rate can be reliably obtained.

Finally, according to the fifth aspect, it becomes possible to operate the fluid system efficiently.

DESCRIPTION OF EMBODIMENTS

Embodiments of the present invention are described below with reference to the drawings. Note that the foregoing embodiments are merely beneficial examples in nature, and are not intended to limit the scope, application, or uses of the present invention.

First Embodiment of Invention

Figure 1:
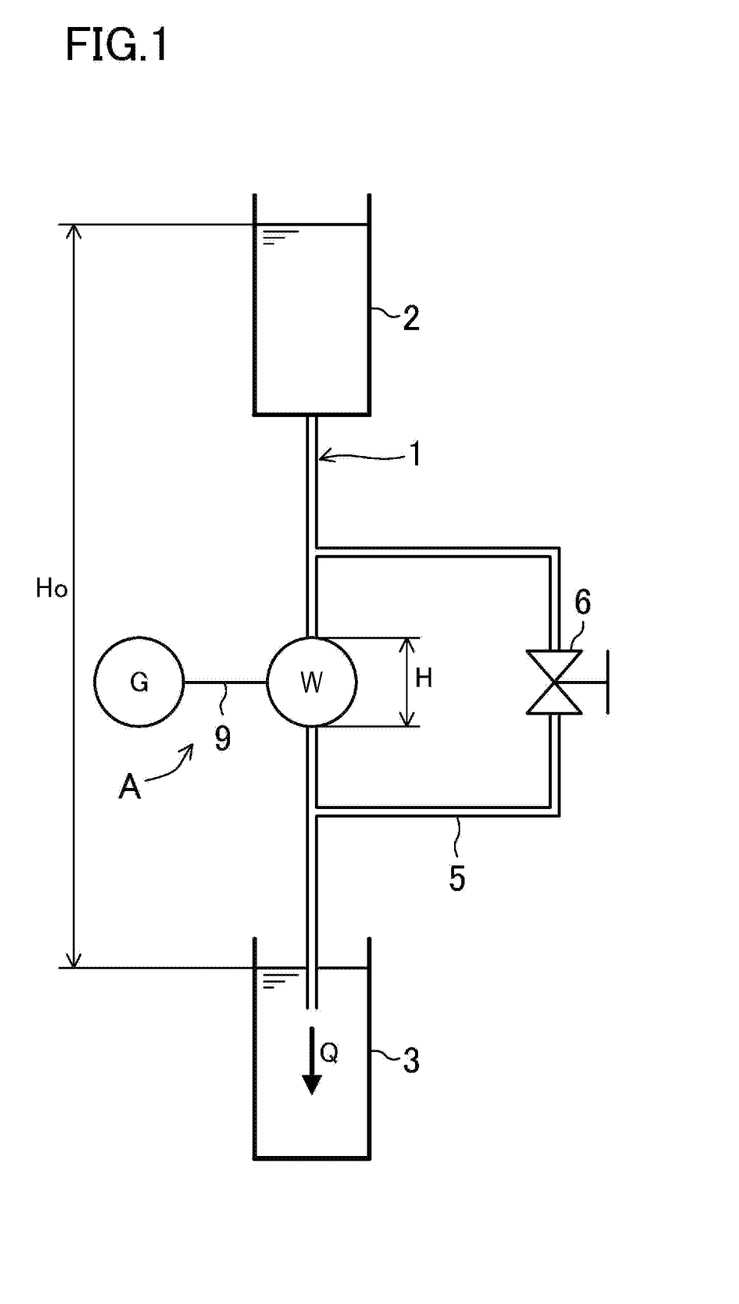
FIG. 1 is a schematic diagram showing an overall configuration of a pipe system including a fluid system according to a first embodiment.

FIG. 1 schematically shows an overall configuration of a pipe system (1) including a fluid system (A) according to a first embodiment of the present invention. In FIG. 1, the pipe system (1) has an upstream end and a downstream end. A storage tank (2) for water (a fluid) is located at the upstream end. A water-receiving tank (3) is located at the downstream end. A water turbine (W) of the fluid system (A) is located in the run of the pipe system (1). More specifically, the pipe system (1) features a height difference and allows a fluid to flow through. The water turbine (W) is an example fluid machine of the present invention. A rotating electrical machine (G) is connected to a rotation shaft (9) of the water turbine (W). Further, a bypass circuit (5), which bypasses the water turbine (W), is connected to the pipe system (1). An electromagnetic flow rate control valve (6) is located in the run of the bypass circuit (5). More specifically, the flow rate control valve (6) is connected to the pipe system (1) in parallel to the water turbine (W). The flow rate control valve (6) is used when, for example, an amount of water to be supplied from the storage tank (2) to the pipe system (1) exceeds a maximum processable flow rate. Then the flow rate control valve (6) is controlled to open such that part of the amount of water flowing from the storage tank (2) passes through the bypass circuit (5) and flows back to the pipe system (1) at a downstream side of the water turbine (W).

In the pipe system (1) in FIG. 1, a height difference between a water surface in the storage tank (2) and a water surface in the water-receiving tank (3) is defined as a total height difference (Ho). A height difference obtained by subtracting a height difference, which is equivalent to a pipe resistance until water flowing from the storage tank (2) via the pipe system (1) reaches the water-receiving tank (3), from the total height difference (Ho) is an effective height difference (H) in the water turbine (W).

Figure 2:
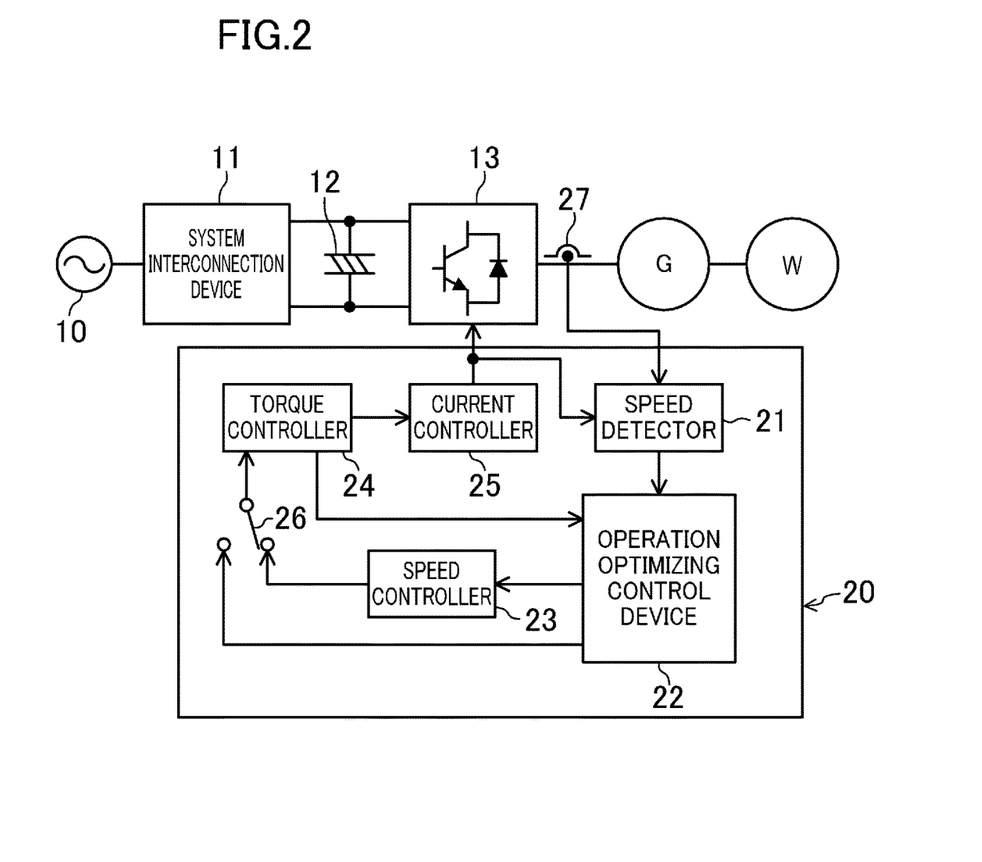
FIG. 2 is a block diagram showing a control system and a power source interconnection system in a rotating electrical machine of the fluid system.

FIG. 2 shows a control system and a power source interconnection system of a rotating electrical machine (G). In FIG. 2, the rotating electrical machine (G) is a generator which generates an output. The output generated is converted to DC output by a converter (13), and subsequently smoothed by a smoothing capacitor (12), output to a system interconnection device (11), and returned to a power source (10).

Moreover, a control device (20) is provided for the control system. The control device (20) controls an operating state of the rotating electrical machine (G) through the converter (13). In this example, the control device (20) includes a microcomputer and a memory device in which a program, which operates the microcomputer, is stored. A characteristic map (M)—shown in FIG. 3—is stored in advance in the control device (20). The characteristic map (M) records, on an H-Q map, characteristics which are detectable in the rotating electrical machine (G) and which correlate with the flow rate (Q) and the effective height difference (H) in the water turbine (W). On the H-Q map, the effective height difference (H) of the pipe system (1) is shown on a vertical axis and the flow rate (Q) of water supplied to the water turbine (W) is shown on a horizontal axis. In this example, characteristics which correlate with the flow rate (Q) and the effective height difference (H) are a torque value (T), a rotation speed, and a generated power (P) of the rotating electrical machine (G). More specifically, the characteristic map (M) of the present embodiment records a plurality of constant torque curves and constant speed curves on the H-Q map. The characteristic map (M) is stored in form of a table (mathematical table) or a mathematical formula (function) in the program in the memory device, i.e., in the control device (20).

Figure 3:
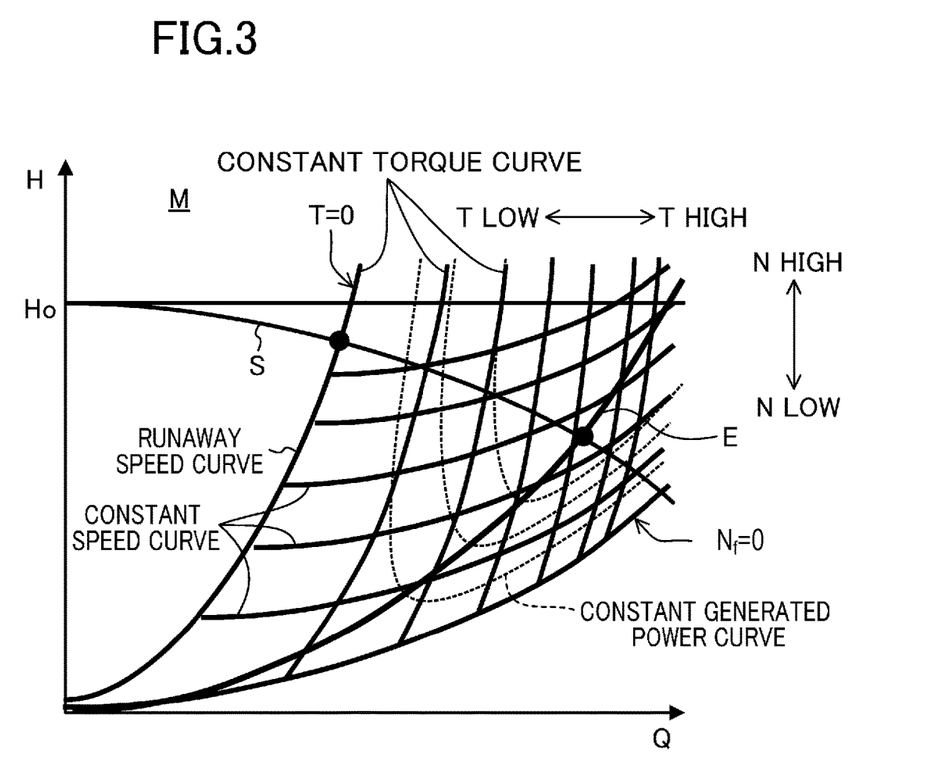
FIG. 3 shows a characteristic map which is memorized in advance by a control device provided for the fluid system.

In the characteristic map (M), an area between a runaway speed curve with a torque zero value (T=0), which means that no load is applied to the rotating electrical machine (G), and a constant speed curve with a frequency zero value ($N_f$=0) is a water turbine area (operating area). In the water turbine area, basically, a stream rotates the water turbine (W) which again drives the rotating electrical machine (G) operating as a generator in rotation. An area to the left of the runaway speed curve is a water turbine break area (powering area).

In the water turbine area, a plurality of constant torque curves extends alongside of the runaway speed curve (T=0). On the map, a torque value increases along with the flow rate (Q). Further, a plurality of constant speed curves extends alongside of the constant speed curve with a frequency zero value ($N_f$=0). The higher the effective height difference (H) becomes, the more the frequency increases. Moreover, constant generated power curves which curve downward are indicated by dashed lines. Generated power also increases along with the effective height difference (H) and the flow rate (Q). A curve (E), which connects pitches of the constant generated power curves, is a maximum power-generating capacity curve indicating where the rotating electrical machine (G) operating as a generator accomplishes a maximum power-generating capacity. The characteristic map (M), which records the torque value (T), rotation speed (N), and generated power (P) of the rotating electrical machine (G) on the H-Q map, is unrelated to the pipe system (1) connected to the fluid system (A). The characteristic map (M) is a characteristic map intrinsic to the fluid system (A).

A system loss curve (S) of the pipe system (1), which has been measured during an actual operation, is recorded on the characteristic map (M). A measurement operation for the system loss curve (S) will be described in detail later. The system loss curve (S) is a flow resistance characteristic line intrinsic to the pipe system (1) shown in FIG. 1. The effective height difference (H) when the flow rate (Q) is zero is the total height difference (Ho). The system loss curve (S) has the characteristic that the effective height difference (H)

decreases like a quadratic curve as the flow rate (Q) increases. The system loss curve (S) has a curvature intrinsic to the pipe system (1) of FIG. 1. A total flow rate (QT) in the pipe system (1), which includes the fluid system (A), and the effective height difference (H) in the case of the total flow rate (QT) correspond to a point on the system loss curve (S). For example, if the flow rate control valve (6) is completely closed and water flows only to the water turbine (W), the flow rate at the water turbine (W) is the total flow rate (QT) of the pipe system (1) including the fluid system (A). A point, which corresponds to the flow rate (Q) and the effective height difference (H) of the water turbine (W) at this time, lies on the system loss curve (S). In other words, an operating point of the water turbine (W) lies on the system loss curve (S).

Further, if water flows into both the water turbine (W) and the bypass circuit (5), a sum of the flow rate in the water turbine (W) and the flow rate in the bypass circuit (5) (i.e., the flow rate in the flow rate control valve (6)) is the total flow rate (QT) of the pipe system (1) including the fluid system (A). The total flow rate (QT) and the effective height difference (H) in the case of the total flow rate (QT) correspond to a point lying on the system loss curve (S), whereas no operating point of the water turbine (W) lies on the system loss curve (S).

The system loss curve (S) determined is also stored on the memory device, i.e., the control device (20), in form of a table (mathematical table) or a mathematical formula (function) in a program.

Returning to FIG. 2, a speed detector (21), an optimal operation control device (22), a speed controller (23), a torque controller (24), a current controller (25), and a selector (26) are provided inside the control device (20). The speed detector (21) receives an output of a current sensor (27), which detects an output current of the rotating electrical machine (G), and an output of the current controller (25), and detects the rotation speed (N) of the rotating electrical machine (G).

Based on the rotation speed (N) detected by the speed detector (21) and the torque value (T) obtained from the torque controller (24), the optimal operation control device (22) computes (i.e., estimates) an operating point (the effective height difference (H) and the flow rate (Q)) of the water turbine (W) on the characteristic map (M), which is an operating point corresponding to this rotation speed (N) and to this torque value (T). Then the optimal operation control device (22) computes a torque command value (T*) or a rotation speed command value to transit from this operating point of the water turbine (W) to an operating point on a maximum power-generating capacity curve (E) where a maximum power-generating capacity is achieved. Moreover, the optimal operation control device (22) uses a selector (26) to switch between speed control and torque control in accordance with an operating state.

Figure 4:
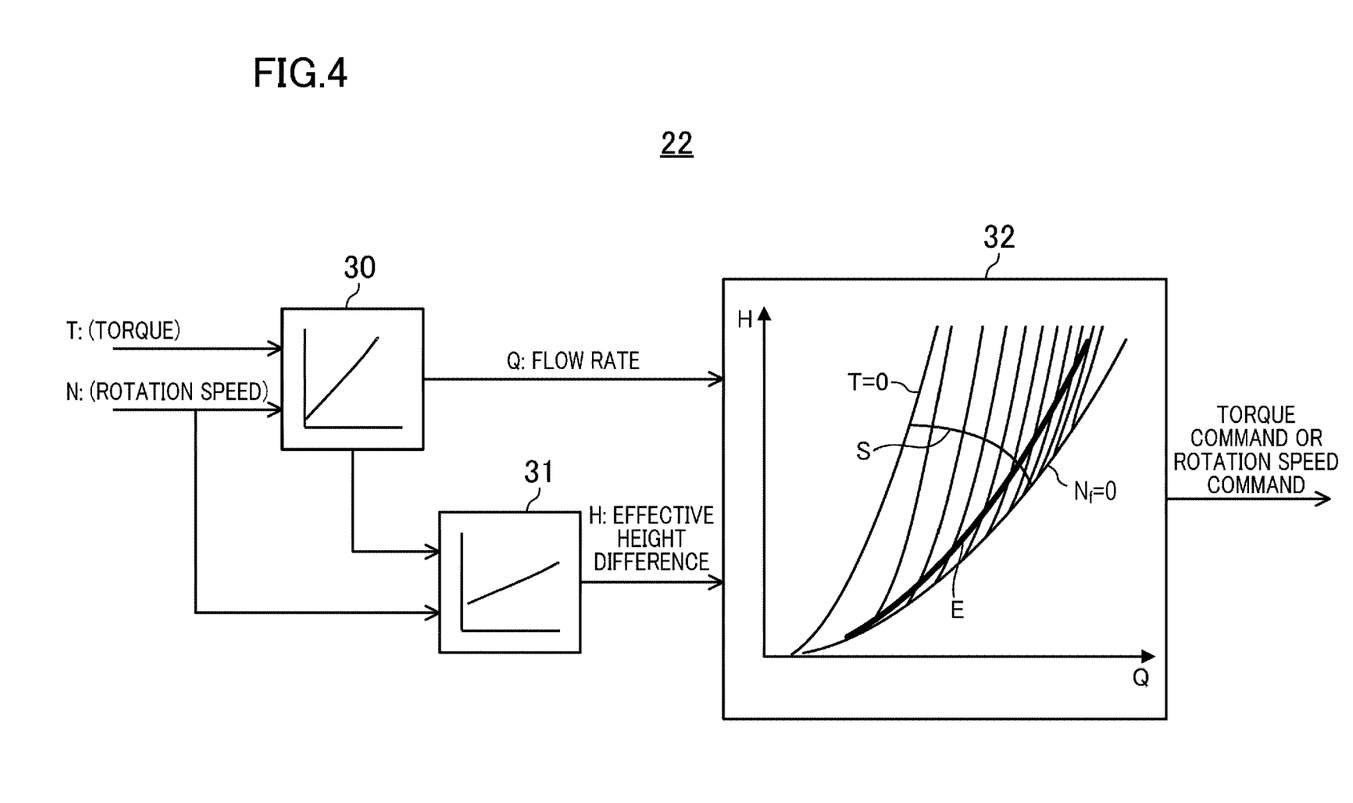
FIG. 4 is a block diagram showing an inner configuration of an operation optimizing control device provided for the control device.

An inner configuration of the optimal operation control device (22) of the control device (20) is shown in FIG. 4. The optimal operation control device (22) includes a flow rate calculating unit (30), an effective height difference calculating unit (31), and an optimal operation command calculator (32). The flow rate calculating unit (30) obtains the rotation speed (N) from the speed detector (21) shown in FIG. 2, and the torque value (T) from the torque controller (24), and computes the flow rate (Q) at an operating point of the rotating electrical machine (G), which is an operating point on the characteristic map (M) of FIG. 3 depending on this rotation speed (N) and on this torque value (T). Further, the effective height difference calculating unit (31) receives a value internally computed by the flow rate calculating unit (30) (i.e., an estimated value of the flow rate (Q)) and the rotation speed (N) from the speed detector (21), and computes the effective height difference (H) at an operating point on the characteristic map (M), which is an operating point depending on this flow rate (Q) and on this rotation speed (N). That is, the effective height difference calculating unit (31) estimates the effective height difference (H). Based on the flow rate (Q) calculated by the flow rate calculating unit (30) and on the effective height difference (H) calculated by the effective height difference calculating unit (31), the optimal operation command calculator (32) computes a torque command value or a rotation speed command value which allows for transiting from the operating point of the water turbine (W) on the characteristic map (M), which is the operating point depending on the flow rate (Q) and the effective height difference (H) determined by calculation, to an operating point on the maximum power-generating capacity curve (E) where a maximum power-generating capacity is achieved.

<Determination of System Loss Curve (S) of Pipe System (1)>

Figure 5:
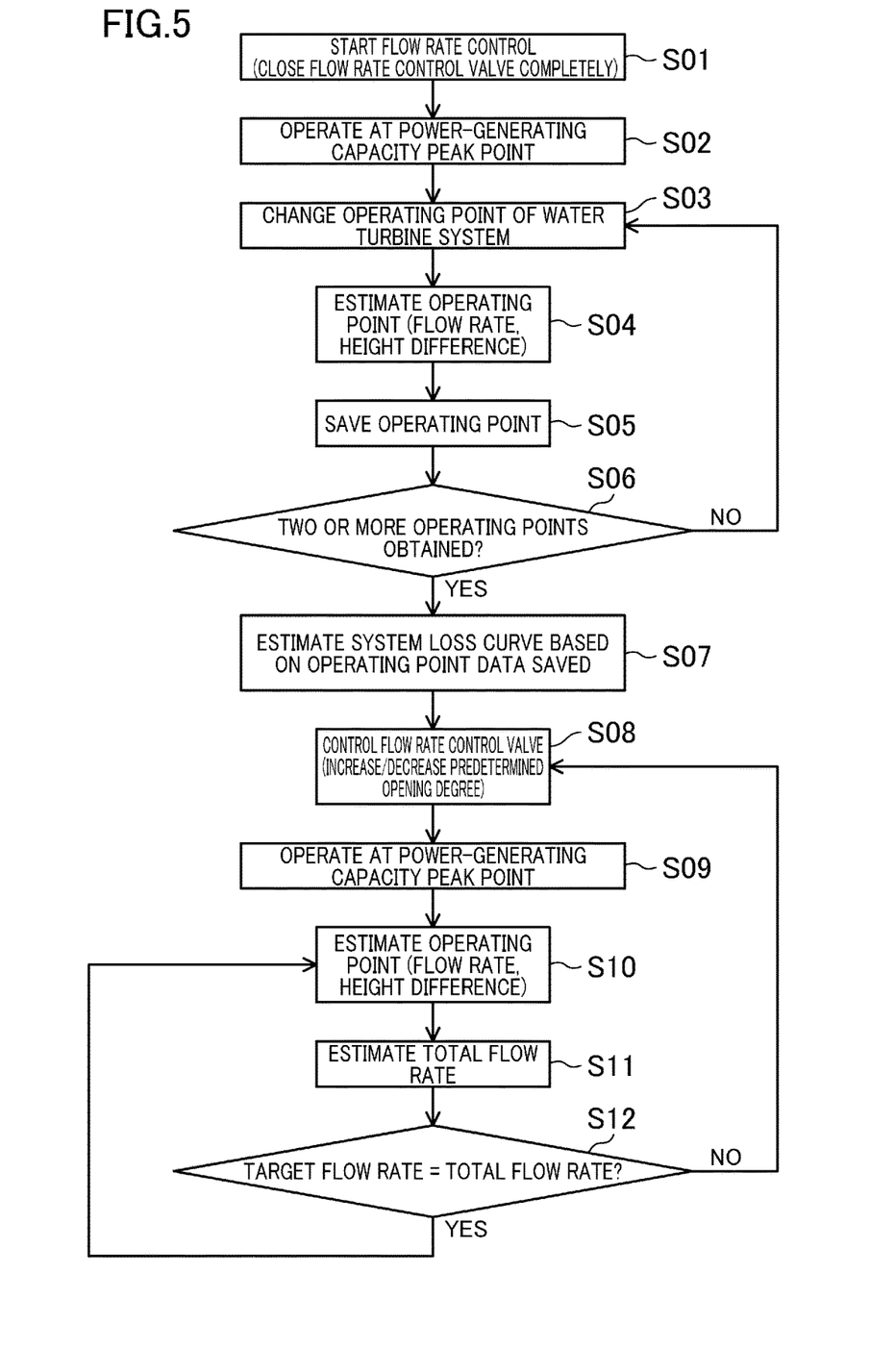
FIG. 5 is a flowchart depicting how a system loss curve according to the first embodiment is built, and explaining cooperative control.

Determination of the system loss curve (S) is explained in detail as follows. FIG. 5 is a flowchart depicting how a system loss curve (S) is built and put under cooperative control, which will be described later. In a state in which the flow rate control valve (6) of the pipe system (1) is closed (see Step S01), the case in which the rotating electrical machine (G) is first operated at an arbitrary operating point within the water turbine area on the characteristic map (M)—e.g., at an operating point (Y) on the maximum power-generating capacity curve (E) in the characteristic map (M) shown in FIG. 6—will be exemplified (hereinafter the operating point (Y) is also referred to as a "power-generating capacity peak point"). At this time, the control device (20) puts the rotation speed (N) and the torque value (T) of the rotating electrical machine (G) under sequential search control (MPPT (maximum power point tracking) control) such that the operating point (Y) on the maximum power-generating capacity curve (E) is reached (Step S02). Note that in the scope of the MPPT control, the control device (20) controls a load, i.e., a converter (13), of the rotating electrical machine (G).

Further, the control device (20) changes the operating point while the flow rate control valve (6) is kept in a closed state (see step S03). For example, first, the control device (20) operates the rotating electrical machine (G) after having set the torque command value (T*), which is communicated to the torque controller (24), to a predetermined percentage value, e.g., 30%, of the present torque value (T). After having waited for a predetermined time until this operating state has stabilized, the control device (20) estimates the flow rate (Q) and the effective height difference (H) at this operating point (step S04). Specifically, the control device (20) monitors the rotation speed (N) of the rotating electrical machine (G)—the rotation speed (N) having been detected by the speed detector (21)—and the torque value (T) obtained from the torque controller (24), and determines a flow rate (Q) and effective height difference (H) of an operating point on the characteristic map (M), which is an operating point depending on the rotation speed (N) and the torque value (T) detected. Then, the control device (20) stores the flow rate (Q) and the effective height difference (H) determined in the memory device inside the control device (20) (step S05).

Thereafter, the control device (20) sets the torque command value (T*) communicated to the torque controller (24)

to percent values of, e.g., 60%, 90% and 120% of the initial torque value (To) in this order. The control device (20) operates the rotating electrical machine (G) as described above at torque command values (T*) set to each these percent values respectively, and monitors the rotation speed (N) and the torque value (T) of the rotating electrical machine (G) during each operating state. Then the control device (20) determines a flow rate (Q) and effective height difference (H) of an operating point on the characteristic map (M), which is an operating point depending on information regarding the rotation speed (N) and the torque value (T) monitored. Note that the torque command value (T*) is set to a value on the runaway speed curve equal to or higher than T=0. When it comes to changing the operating state of the rotating electrical machine (G), the rotation speed (N) may be changed instead of the torque command value (T*). Alternatively, a combination of these values may be changed.

Next, the control device (20) verifies whether information regarding two or more operating points, which are required for building the system loss curve (S), have been obtained (step S06). If the required amount of operating points has not been obtained, the process moves back to step S03 to change the operating point. After the operating point has been changed, the flow rate (Q) and the effective height difference (H) are estimated based on the characteristic map (M).

Figure 6:
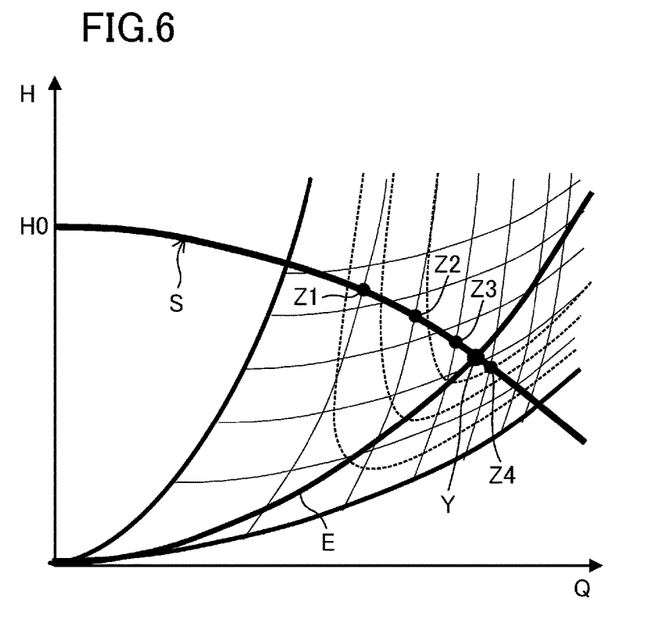
FIG. 6 is an explanatory diagram showing a state in which a system loss curve is estimated.

On the other hand, if the required amount of operating points has been obtained, the control device (20) builds the system loss curve (S) (step S07). In this example, as shown in FIG. 6, a plurality of operating points (Z1) to (Z4) has been obtained (four points in this description). Thus, data regarding these operating points are used to estimate the system loss curve (S) of the pipe system (1). When it comes to estimating the system loss curve (S), specifically, the system loss curve (S) is calculated by using a pipe characteristic model memorized in advance. This pipe characteristic model is based on the characteristic that the effective height difference (H) decreases proportionally to the square of the flow rate (Q) as can be seen on the system loss curve (S) shown in FIG. 3, i.e., on the characteristic that the pipe resistance increases proportionally to the square of the flow rate (Q). A characteristic curve of the pipe characteristic model is expressed as a table or mathematical formula. Based on the operating points obtained and the pipe characteristic model expressed by the characteristic curve, the total height difference (Ho) of the pipe system (1) and a pipe resistance coefficient are estimated, and a new system loss curve (S) of the pipe system (1) is derived by interpolating data from between the operating points obtained. This system loss curve (S) is derived in the water turbine area, in the water turbine break area, and in an area to the right of the constant speed curve with a frequency zero value ($N_f$=0) (hereinafter referred to as a "high flow rate area" for the sake of explanation). In this example, when it comes to the water turbine area, the water turbine (W) is actually operated and measurements are performed. When it comes to the high flow rate area, a mathematical formula (or a numeric value) obtained based on measurement results regarding the water turbine area is used to extrapolate points into the high flow rate area. By this, the system loss curve (S) in the high flow rate area, in which the water turbine (W) cannot be operated, can be obtained. The system loss curve (S) of the pipe system (1) built in this manner is recorded on the characteristic map (M) shown in FIG. 3. Specifically, the control device (20) stores the system loss curve (S) in form of a table or a mathematical formula related to the characteristic map (M) on the memory device inside the control device (20).

Note that the system loss curve (S) can be built if data of at least two operating points have been obtained.

In the present embodiment, when it comes to estimating of the system loss curve (S), the operating point (torque value (T) and rotation speed (N)) of the rotating electrical machine (G) has been changed several times as described above, and the flow rate (Q) and the effective height difference (H) on the characteristic map (M) have been obtained for each of these operating points respectively. That is, the system loss curve (S) of the pipe system (1) has been built without installing an expensive sensor, such as a flow rate sensor or a pressure sensor, in the pipe system (1).

Further, regarding the timing of building the system loss curve (S), the system loss curve (S) may be built when a system for installing the fluid system (A) in the pipe system (1) is built. Alternatively, the control device (20) may be provided with the capability to renew the flow resistance characteristic line (S) built. In this case, the control device (20) can appropriately renew the flow resistance characteristic line (S) as necessary after the fluid system (A) has been run.

<Cooperative Operation of Water Turbine (W) and Flow Rate Control Valve (6)>

In the fluid system (A), the operating point of the water turbine (W) changes when the flow rate control valve (6) is operated, and the flow rate of the bypass circuit (5) fluctuates when the operating point of the water turbine (W) is changed. Thus, in this fluid system (A), cooperative control of the water turbine (W) and the flow rate control valve (6)—i.e., control which takes into consideration both the state of the water turbine (W) and the state of the flow rate control valve (6)—is necessary.

In the following, cooperative operation of the water turbine (W) and the flow rate control valve (6) (cooperative control of the water turbine (W) and the flow rate control valve (6) by the control device (20)) will be explained through a case example in which the target flow rate (QT*) of the total flow rate (QT) flowing through the pipe system (1) exceeds a maximum processable flow rate (Qm) of the water turbine (W).

Figure 7:
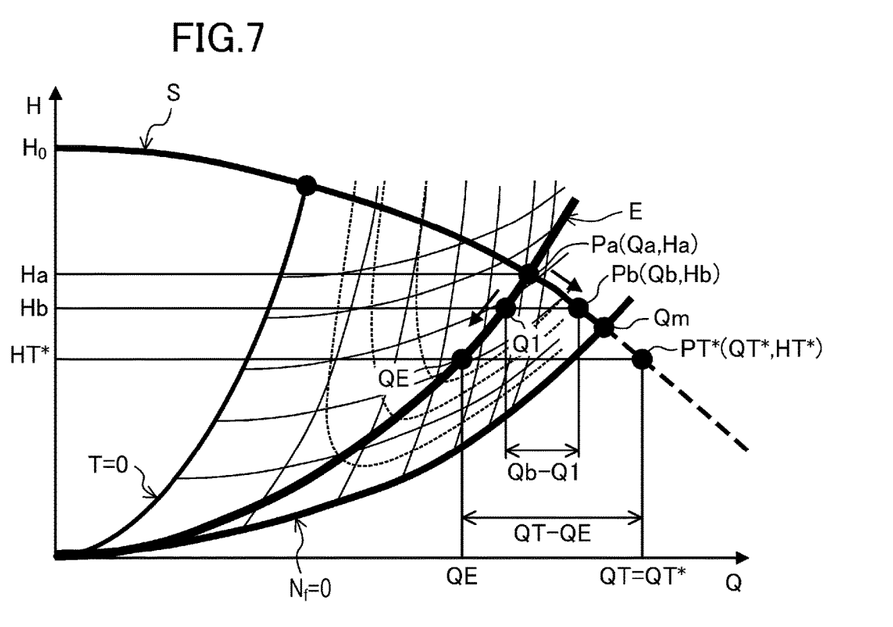
FIG. 7 is a characteristic map explaining a state in which a water turbine and a flow rate control valve of the fluid system perform cooperative operation.

In the flowchart of FIG. 5, steps S08 to S12 correspond to the cooperative control. As the initial operating state of the water turbine (W), control may be started from any operating point (as the target flow rate (QT*), a value in the water turbine area or a value in the high flow rate area may be employed). Here, a case in which the water turbine (W) is operated at an operating point (Pa) having a flow rate (Qa) and an effective height difference (Ha) on the system loss curve (S) in the characteristic map (M) shown in FIG. 7—i.e., at an intersection between the system loss curve (S) and the maximum power-generating capacity curve (E)—and in which the rotating electrical machine (G) is operated at a maximum power-generating capacity will be explained as an example. At this time, the flow rate control valve (6) is completely closed. Note that the control device (20) can estimate the flow rate (Qa) and the effective height difference (Ha) at this time based on the characteristic map (M). If the flow rate control valve (6) is completely closed, the flow rate (Qa) in the water turbine (W) is the total flow rate (QT) of the pipe system (1).

Now it is assumed that a flow rate which exceeds the maximum processable flow rate (Qm) of the water turbine (W) is required as the target flow rate (QT*) of the total flow rate (QT) flowing through the pipe system (1). On the characteristic map (M) shown in FIG. 7, this target flow rate (QT*) is a flow rate corresponding to a point on the system loss curve (S) which, e.g., exceeds the maximum processable flow rate (Qm) of the water turbine (W) (a flow rate on the constant speed curve with the frequency zero value ($N_f=0$)) at a right border of the water turbine area in FIG. 7).

When the cooperative control is started, the control device (20) controls an opening degree of the flow rate control valve (6) such that the flow rate control valve (6) opens to the minute opening degree (step width) previously set and a liquid (water in this case) begins to flow through the bypass circuit (5) (step S08). Moreover, while maintaining the opening degree of the flow rate control valve (6) as it is, the control device (20) performs sequential search control (MPPT control) of the operating state of the rotating electrical machine (G) (i.e., the rotation speed (N) or the torque value (T), or both values) such that an operating point on the maximum power-generating capacity curve (E) is converged (step S09). Of course, the total flow rate can be controlled even if an operating point other than the power-generating capacity peak point is reached. Reaching the power-generating capacity peak point is only an example.

By such control, the total flow rate (QT) of the pipe system (1) increases, and the initial flow rate (Qa) becomes a flow rate (e.g., a flow rate (Qb)) corresponding to a point (Pb) on the system loss curve (S). At this time, a height difference equivalent to the pipe resistance in the pipe system (1) increases along with the total flow rate (QT), whereas the effective height difference decreases from the effective height difference (Ha) to an effective height difference (Hb). On the other hand, the flow rate at the water turbine (W) converges from the initial flow rate (Qa) to a flow rate (Q1) (Q1<Qa) of the operating point on the maximum power-generating capacity curve (E), which is the operating point corresponding to the effective height difference (Hb). Consequently, the flow rate at the flow rate control valve (6) is a flow rate (Qb−Q1), which is a difference between the present total flow rate (QT) of the pipe system (1), i.e., a flow rate (Qb), and the flow rate (Q1) at the water turbine (W).

Next, the control device (20) estimates the flow rate (Q) and the effective height difference (H) at this operating point (step S10). Able to obtain the present rotation speed (N) and the present torque value (T), the control device (20) estimates the flow rate (Q1) of the water turbine (W) and the effective height difference (Hb), i.e., the operating point of the water turbine (W), based on the values obtained and the characteristic map (M) (step S10). If the operating point of the water turbine (W) is obtained in this manner, the control device (20) can estimate the flow rate (Qb), which is the total flow rate (QT) corresponding to the effective height difference (Hb), based on the effective height difference (Hb) estimated in step S10 and the system loss curve (S) (step S11).

As can be seen, with the control device (20) putting the water turbine (W) and the flow rate control valve (6) under cooperative control, the total flow rate (QT) of the pipe system (1) increases from the flow rate (Qa) to the flow rate (Qb). At the same time, in the water turbine area (an area where the water turbine (W) can operate), the flow rate of the water turbine (W) is set to the flow rate (Q1) corresponding to the operating point on the maximum power-generating capacity curve (E). As a result, the rotating electrical machine (G) can achieve a maximum power-generating capacity with an even higher efficiency. That is, the control device (20) controls the rotating electrical machine (G) in an operating state which allows the fluid system (A), which employs the rotating electrical machine (G) as a generator, to achieve a maximum power-generating capacity.

Then, the control device (20) compares the present total flow rate (QT) and the present target flow rate (QT*) with each other (step S12). If the total flow rate (QT) has converged to the target flow rate (QT*) (e.g., if both are equal), the process returns to the processing preformed in step S10. If that is not the case, the control device (20) sequentially repeats controlling the opening degree of the flow rate control valve (6) such that the flow rate control valve (6) opens another minute opening degree (step width) further. Each time the flow rate control valve (6) opens another minute opening degree further, the control device (20) performs sequential search control (MPPT control) of the operating state of the rotating electrical machine (G) such that an operating point on the maximum power-generating capacity curve (E) is converged (steps S08 to S12).

By such control, the flow rate at the flow rate control valve (6) gradually increases, and the total flow rate (QT) of the pipe system (1) increases from the flow rate (Qb) toward the target flow rate (QT*), which exceeds the maximum processable flow rate (Qm) of the water turbine (W). On the other hand, the flow rate of the water turbine (W) decreases downward to the left on the maximum power-generating capacity curve (E) in FIG. 7. That is, the control device (20) performs cooperative control of the water turbine (W) and the flow rate control valve (6) such that an estimated value of the total flow rate (QT) of the pipe system (1) becomes close to the target flow rate (QT*) of the total flow rate (QT) in the pipe system (1).

When the total flow rate (QT) has converged to the target flow rate (QT*), the flow rate at the flow rate control valve (6) is a flow rate (QT−QE), which is a difference between the target flow rate (QT*) and a flow rate (QE) at the water turbine (W). The total flow rate (QT) in the high flow rate area can be controlled in this way because the system loss curve (S) has been extrapolated to this area. Of course it goes without saying that the control device (20) can estimate the total flow rate (QT) in the water turbine area.

<Advantages of First Embodiment>

As can be seen from the above description, according to the present embodiment, in a fluid system, which includes a bypass circuit, the total flow rate can be controlled without using a flowmeter. Consequently, costs can be expected to be lowered and space can be expected to be saved as compared to the case of total flow rate control with a flowmeter. Moreover, the total flow rate can be controlled during operation in both the water turbine area and the high flow rate area.

Furthermore, in the present embodiment, by performing cooperative control of the water turbine (W) and the flow rate control valve (6), a maximum power-generating capacity achievable at the total flow rate (QT) can be achieved while maintaining the total flow rate (QT) of the pipe system (1) as the target flow rate (QT*). That is, a highly efficient operation can be performed. This highly efficient operation can be performed in both the water turbine area and the high flow rate area. Consequently, in the present embodiment, e.g., in a case in which a value from within the water turbine area is provided as the target flow rate (QT*) of the total flow rate (QT), the control device (20) can for example control the flow rate control valve (6) to open such that the operating point of the water turbine (W) is controlled to become close to a point on the maximum power-generating capacity curve (E).

Further, after the fluid system (A) has been activated, it is possible to maintain a high degree of precision in estimating the flow rate and the effective height difference by allowing the control device (20) to renew the system loss curve (S) as necessary.

Second Embodiment of Invention

In a second embodiment, examples other than the process for building the system loss curve will be explained.

Figure 8:
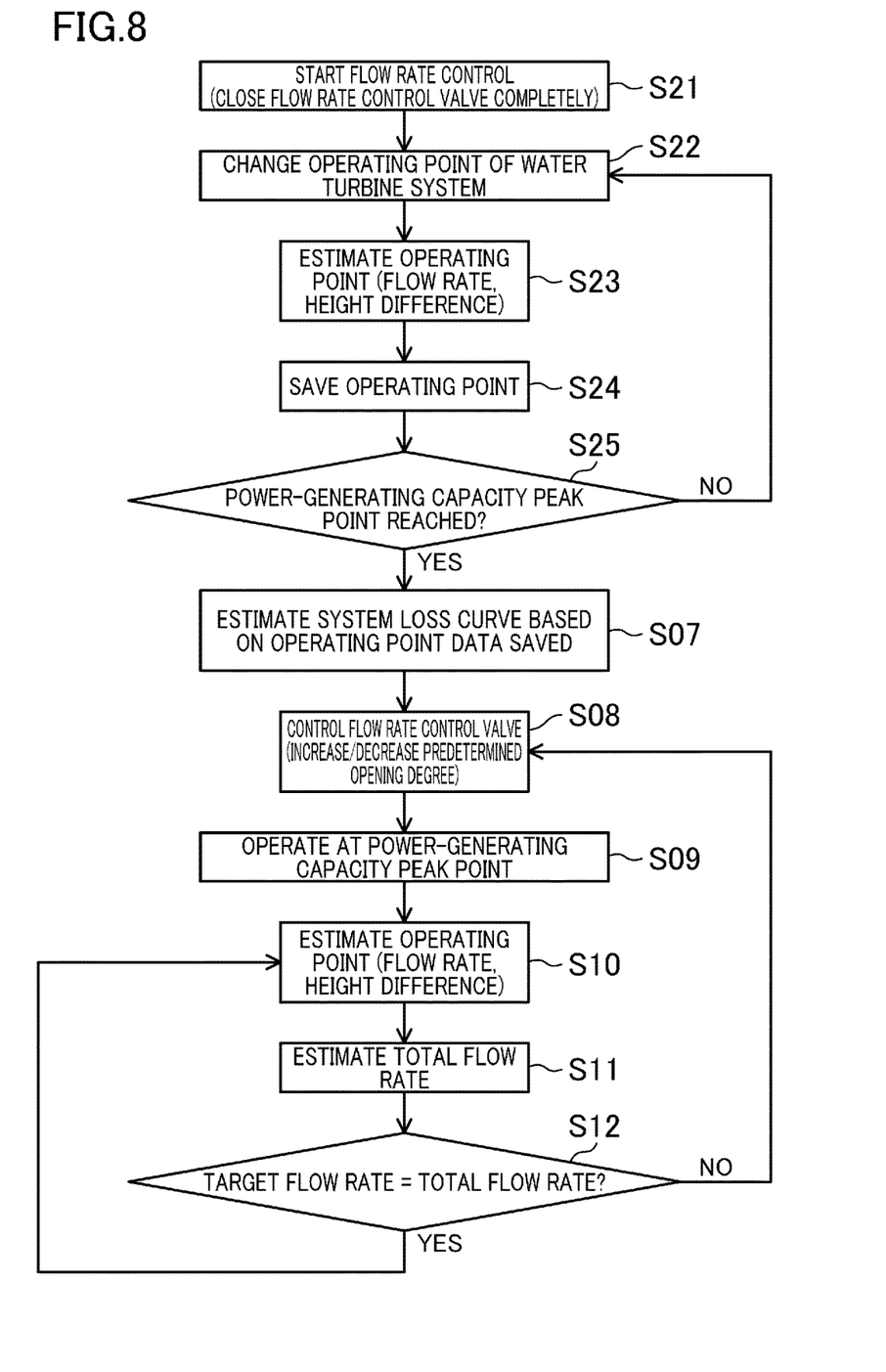
FIG. 8 is a flowchart depicting how a system loss curve according to a second embodiment is built, and explaining cooperative control.

FIG. 8 is a flowchart depicting how a system loss curve (S) according to the second embodiment is built. This process includes steps S21 to S25 and steps S07 to S12. Steps S08 to S12 constitute the process of performing the cooperative control, and are the same as those described in the first embodiment. On the other hand, steps S21 to S25 and step S07 constitute the process of building the system loss curve (S). Inter alia, steps S21 to S25 are different from those in the first embodiment. The flow will be described hereinafter with a focus on aspects different from the first embodiment.

Also in the present embodiment, as shown in FIG. 8, the control device (20) closes the flow rate control valve (6) completely such that the water turbine (W) starts to operate (step S21). In this state, the control device (20) sets an operating point at an adequate initial state (step S22). Next, after having waited for a predetermined time until the operating state at this operating point has stabilized, the control device (20) estimates the operating point (step S23). Also in estimating the operating point of this embodiment, the control device (20) monitors the rotation speed (N) of the rotating electrical machine (G), which has been detected by the speed detector (21), and the torque value (T) obtained from the torque controller (24), and determines the flow rate (Q) and the effective height difference (H) of an operating point on the characteristic map (M), which is an operating point depending on the rotation speed (N) and the torque value (T) detected. Then, the control device (20) stores the flow rate (Q) and the effective height difference (H) determined in the memory device inside the control device (20) (step S24).

Next, the control device (20) verifies whether the present operating point is the power-generating capacity peak point (step S25). If this verification shows that, e.g., the power-generating capacity peak point has not been reached, the process returns to step S22 and the operating point is changed. Then, the flow rate (Q) and the effective height difference (H) at the operating point changed are estimated. The flow rate (Q) and the effective height difference (H) obtained by this estimation are stored in the memory device (steps S23 to S24). Note that the system loss curve (S) can be built (estimated) if data regarding at least two operating points have been obtained. In general, however, a sufficient amount of data for estimating the system loss curve (S) can be obtained by repeatedly changing the operating point until the operating point converges to the power-generating capacity peak point.

If the verification of step S25 shows that the operating point has reached the power-generating capacity peak point, the control device (20) estimates the system loss curve (S) (step S07). In the present embodiment, the system loss curve (S) is estimated in the same manner as in the first embodiment. Thereby, when it comes to the high flow rate area, a mathematical formula (or a numeric value) obtained based on measurement results regarding the water turbine area is used to extrapolate points into the high flow rate area in the same manner as in the first embodiment, and to estimate the system loss curve (S) for the high flow rate area.

The system loss curve (S) estimated in this manner can also be used for cooperative control (steps S08 to S12). The steps S08 to S12 shown in FIG. 8 are the same as those of the first embodiment, and also in the present embodiment the total flow rate can be controlled without using a flowmeter. That is, in the present embodiment the same effects can be obtained as in the first embodiment.

Other Embodiments

In the above embodiment, the operating state of the rotating electrical machine (G) is controlled such that a maximum power-generating capacity is achieved. However, the present invention is not limited to this. The rotating electrical machine (G) may as well be controlled to reach a predetermined operating state. For example, instead of the maximum power-generating capacity curve (E), a curve showing the efficiency of the rotating electrical machine (G), of the water turbine (W), or of the converter (13) may be stored in the control device (20) as information contained in the characteristic map (M). The rotating electrical machine (G) may be operated at an operating point at which an efficiency determined by this curve is at a maximum. That is, an operating state in which the efficiency of the rotating electrical machine (G), of the fluid machine (W), or of the converter (13) is at a maximum can be used as an index in the case in which the control device (20) puts the rotating electrical machine (G) and the flow rate control valve (6) under cooperative control.

Moreover, as shown in FIG. 3, a system loss curve (S), which shows the effective height difference (H) on its vertical axis and the flow rate (Q) on its horizontal axis, has been employed as the flow resistance characteristic line of the pipe system (1). However, since the effective height difference (H) and a pressure difference between both sides of the water turbine (W) have a linear relationship, a system loss curve (S) which shows the pressure difference (effective pressure difference) between both sides of the water turbine (W) on its vertical axis is equivalent to a system loss curve (S) which shows the effective height difference (H) on its vertical axis. That is, it is possible to employ a system loss curve, which shows the pressure difference between both sides of the water turbine (W) on its vertical axis and the flow rate (Q) on its horizontal axis.

In addition, in the above embodiments, the operating point on the characteristic map (M) of the rotating electrical machine (G) has been obtained based on the rotation speed (N) and the torque value (T). As an alternative, however, the operating point may be obtained by combining the rotation speed (N) or the torque value (T) with a generated power (P). That is, characteristics of the rotating electrical machine (G) used for the characteristic map (M) correlate with the flow rate (Q) and the effective height difference (H) in the water turbine (fluid machine). Provided that these characteristics are detectable, the characteristics are not limited to the rotation speed (N) and the torque value (T).

Further, as long as it is possible to relate the characteristics (i.e., the detectable ones) of the rotating electrical machine (G) to the flow rate (Q) and the effective height difference (H) in the water turbine (W), the water turbine (W) and the rotating electrical machine (G) included in the fluid system (A) are not particularly limited in form. For example, even if the operation of the water turbine (W) cannot be adjusted by the rotating electrical machine (G), thanks to the above embodiment the flow rate (Q) and the effective height difference (H) can still be estimated.

Furthermore, in the above embodiment, the control device (20) controls both the rotating electrical machine (G) and the flow rate control valve (6). Alternatively, of course, a first control device controlling the rotating electrical machine (G), and a second control device controlling the flow rate control valve (6) may be provided, and information regarding the operating state of the rotating electrical machine (G) and the opening degree of the the flow rate control valve (6) may be input and output between these two control devices, such that the control device of the present invention is configured as the first and second control devices.

INDUSTRIAL APPLICABILITY

The present invention is useful for a fluid system.

DESCRIPTION OF REFERENCE CHARACTERS

A Fluid System
G Rotating Electrical Machine
W Water Turbine (Fluid Machine)
1 Pipe System
5 Bypass Circuit
6 Flow Rate Control Valve
9 Rotation Shaft
20 Control Device

The invention claimed is:

1. A fluid system comprising:
a fluid machine installed in a pipe system which has a height difference and through which a fluid flows;
a rotating electrical machine connected to a rotation shaft of the fluid machine;
a flow rate control valve installed in a run of a bypass circuit which is connected in parallel to the fluid machine; and
a control device, which estimates a flow rate and an effective height difference in the fluid machine based on a characteristic which is detectable with regard to the rotating electrical machine and which correlates with the flow rate and the effective height difference in the fluid machine, estimates a total flow rate in the pipe system based on a flow resistance characteristic line intrinsic to the pipe system, and on the flow rate and the effective height difference estimated, and performs cooperative control of the fluid machine and the flow rate control valve such that the estimated value of the total flow rate becomes close to a target flow rate of the total flow rate in the pipe system.

2. The fluid system of claim 1, wherein the control device obtains the total flow rate and the effective height difference at a plurality of operating points of the rotating electrical machine to build the flow resistance characteristic line.

3. The fluid system of claim 2, wherein the control device is capable of renewing the flow resistance characteristic line built.

4. The fluid system of claim 3, wherein the control device repeats the cooperative control such that the estimated value converges to the target flow rate.

5. The fluid system of claim 4, wherein the control device performs the cooperative control such that any operating state among an operating state in which the fluid system, the rotating electrical machine of which serves as a generator, achieves a maximum power-generating capacity, an operating state in which the rotating electrical machine achieves a maximum efficiency, and an operating state in which the fluid machine achieves a maximum efficiency is obtained.

6. The fluid system of claim 3, wherein the control device performs the cooperative control such that any operating state among an operating state in which the fluid system, the rotating electrical machine of which serves as a generator, achieves a maximum power-generating capacity, an operating state in which the rotating electrical machine achieves a maximum efficiency, and an operating state in which the fluid machine achieves a maximum efficiency is obtained.

7. The fluid system of claim 2, wherein the control device repeats the cooperative control such that the estimated value converges to the target flow rate.

8. The fluid system of claim 7, wherein the control device performs the cooperative control such that any operating state among an operating state in which the fluid system, the rotating electrical machine of which serves as a generator, achieves a maximum power-generating capacity, an operating state in which the rotating electrical machine achieves a maximum efficiency, and an operating state in which the fluid machine achieves a maximum efficiency is obtained.

9. The fluid system of claim 2, wherein the control device performs the cooperative control such that any operating state among an operating state in which the fluid system, the rotating electrical machine of which serves as a generator, achieves a maximum power-generating capacity, an operating state in which the rotating electrical machine achieves a maximum efficiency, and an operating state in which the fluid machine achieves a maximum efficiency is obtained.

10. The fluid system of claim 1, wherein the control device repeats the cooperative control such that the estimated value converges to the target flow rate.

11. The fluid system of claim 10, wherein the control device performs the cooperative control such that any operating state among an operating state in which the fluid system, the rotating electrical machine of which serves as a generator, achieves a maximum power-generating capacity, an operating state in which the rotating electrical machine achieves a maximum efficiency, and an operating state in which the fluid machine achieves a maximum efficiency is obtained.

12. The fluid system of claim 1, wherein the control device performs the cooperative control such that any operating state among an operating state in which the fluid system, the rotating electrical machine of which serves as a generator, achieves a maximum power-generating capacity, an operating state in which the rotating electrical machine achieves a maximum efficiency, and an operating state in which the fluid machine achieves a maximum efficiency is obtained.

* * * * *